United States Patent
Moneyhun et al.

(10) Patent No.: US 12,467,007 B2
(45) Date of Patent: Nov. 11, 2025

(54) FUEL GAS CONDITIONER

(71) Applicant: Moneyhun Equipment Sales & Service Co., Inc., Rock Springs, WY (US)

(72) Inventors: David Moneyhun, Rock Springs, WY (US); Bernie Claydon, Kelowna (CA); Evan Visser, Spring, TX (US)

(73) Assignee: Moneyhun Equipment Sales & Service Co., Inc., Rock Springs, WY (US)

(*) Notice: Subject to any disclaimer, the term of this patent is extended or adjusted under 35 U.S.C. 154(b) by 0 days.

(21) Appl. No.: 18/482,166

(22) Filed: Oct. 6, 2023

(65) Prior Publication Data

US 2024/0026240 A1    Jan. 25, 2024

Related U.S. Application Data

(63) Continuation of application No. 17/227,599, filed on Apr. 12, 2021, now abandoned.

(60) Provisional application No. 63/009,764, filed on Apr. 14, 2020.

(51) Int. Cl.
*C10L 3/10* (2006.01)
*B01D 53/00* (2006.01)
*B01D 53/26* (2006.01)

(52) U.S. Cl.
CPC .......... *C10L 3/106* (2013.01); *B01D 53/002* (2013.01); *B01D 53/265* (2013.01); *C10L 2290/08* (2013.01); *C10L 2290/544* (2013.01)

(58) Field of Classification Search
CPC .......... C10L 2290/06; C10L 2290/08; C10L 2290/544; C10L 3/101; C10L 3/106; B01D 53/002; B01D 53/265
See application file for complete search history.

(56) References Cited

U.S. PATENT DOCUMENTS

| | | | |
|---|---|---|---|
| 6,053,965 A * | 4/2000 | Lokhandwala | B01D 53/229 95/52 |
| 10,017,701 B2 | 7/2018 | Meyer | |
| 10,322,397 B2 | 6/2019 | Visser et al. | |

(Continued)

OTHER PUBLICATIONS

"NGL Pro Flare Reduction, NGL Recovery and Gas Conditioning," Aspen Engineering Services, LLC, 23 pgs. (published Mar. 21, 2018). https://documents.pub/documenting/ngl-pro-reduction-ngl-recovery-and-gas-c-pro-flare-reduction-ngl-recovery.html?page=1.

*Primary Examiner* — Prem C Singh
*Assistant Examiner* — Ming Cheung Po
(74) *Attorney, Agent, or Firm* — Thorpe North & Western, LLP

(57) ABSTRACT

A system and method for conditioning fuel gas comprises a separator to receive rich gas and to separate NGLs from the rich gas to produce lean fuel gas. A first valve is coupled before the separator to receive the rich gas to expand the rich gas in a throttling or Joule-Thomson effect to reduce the pressure and temperature of the rich gas for the separator. A heat exchanger is coupled before the first valve to transfer heat from the rich gas to the lean fuel gas. The system can further comprise another separator to receive rich gas to separate water from the rich gas to preprocess the rich gas. The system can further comprise a temperature control loop utilizing a slip stream from the separator, a second expansion valve, and another heat exchanger.

20 Claims, 3 Drawing Sheets

(56) References Cited

U.S. PATENT DOCUMENTS

| | | |
|---|---|---|
| 2009/0031756 A1 | 2/2009 | Betting et al. |
| 2012/0096896 A1* | 4/2012 | Patel .................... F25J 3/0233 |
| | | 62/620 |
| 2014/0174122 A1 | 6/2014 | Cooper et al. |
| 2014/0366577 A1* | 12/2014 | Zubrin .................... C10L 3/10 |
| | | 62/619 |
| 2016/0187057 A1 | 6/2016 | Meyer |
| 2022/0228079 A1 | 7/2022 | Meyer |
| 2022/0228803 A1 | 7/2022 | Meyer |

* cited by examiner

FUEL GAS CONDITIONER

PRIORITY CLAIM

This is a continuation of U.S. patent application Ser. No. 17/227,599, filed Apr. 12, 2021; which claims priority to U.S. Provisional Patent Application Ser. No. 63/009,764, filed Apr. 14, 2020, which are hereby incorporated herein by reference.

BACKGROUND

The present invention relates generally to a fuel gas conditioner to capture and extract water and natural gas liquids (NGLs) from a rich gas stream to produce lean fuel gas.

Raw natural gas sources include, but are not limited to: oil production associated gas, oil tank vapor recovery systems, pipeline gathering systems, facility flare gas, and landfill gas. Natural gas may contain quantities of water and high molecular weight hydro-carbon components (condensate).

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
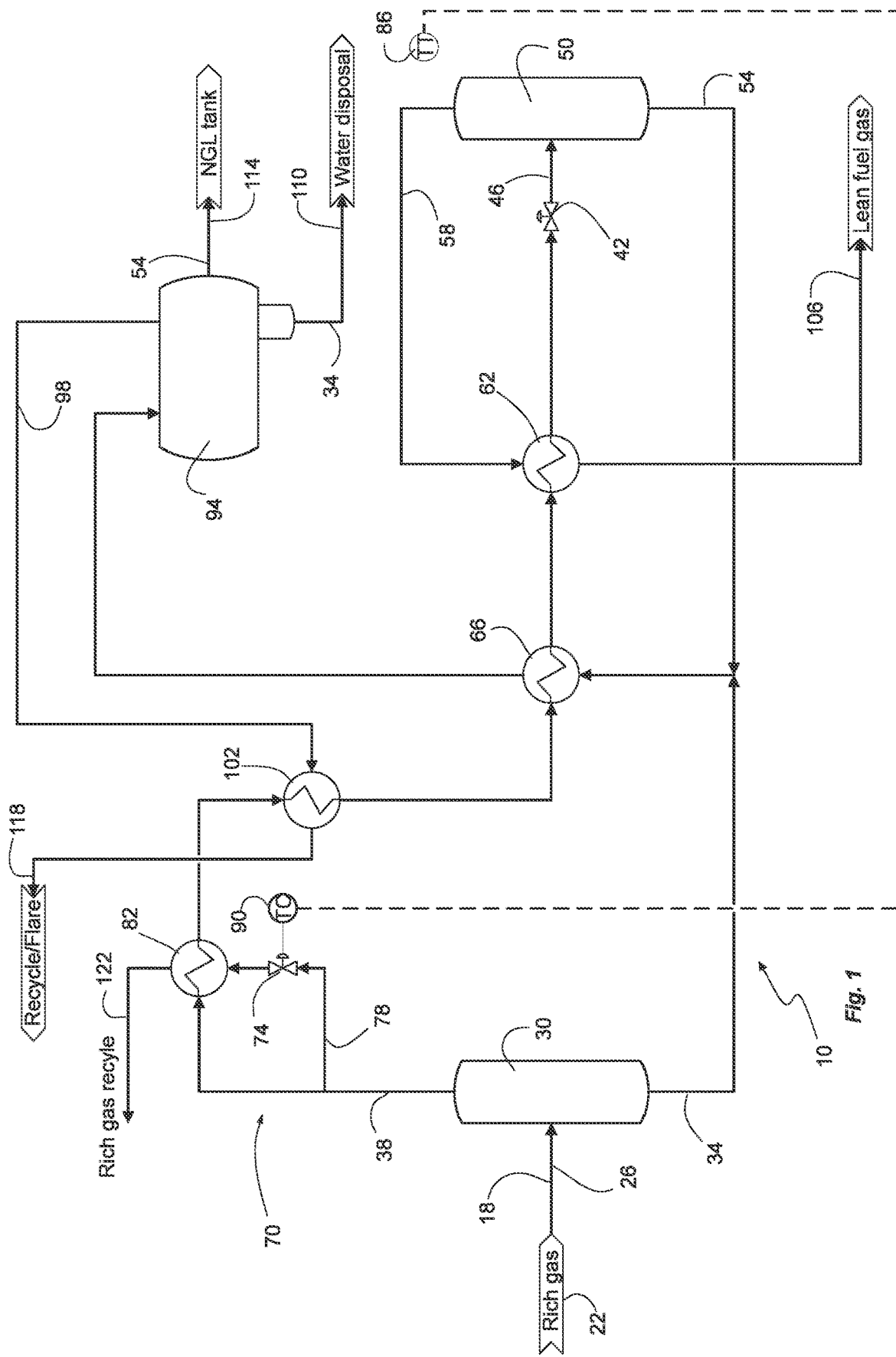
FIG. 1 is a schematic pipe diagram of a fuel gas system in accordance with one embodiment.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

It has been recognized that it would be advantageous to develop a system and method for conditioning rich natural gas to produce lean fuel gas. In addition, it has been recognized that it would be advantageous to develop a system and method to preprocess the rich gas to remove water to make the system and method more efficient. In addition, it has been recognized that it would be advantageous to develop a system and method to provide temperature control for warmer seasons and climates.

A fuel gas conditioning system of the invention can produce a lean fuel gas with HHV less than 1200 Btu/scf using a combination of heat exchangers, separator vessels and pressure control valves which generate a Joule-Thomson or throttling cooling effect. In addition, the system can operate with a feed gas stream at a pressure ranging from 700-1200 psig and a temperature ranging between 60 and 120° F. The cold separation vessel can operate at temperatures ranging from −20° F. to −80° F., and pressures ranging from 60 psig to 350 psig. Multiple heat recovery exchangers can ensure that the lowest possible temperatures are reached. In addition, natural gas liquid (NGL) recovery may also be included. Furthermore, the system can be provided on a skid and delivered to a site requiring gas conditioning, such as a well site adjacent a well head.

The invention presents a system and method for conditioning fuel gas. The system has a (second) separator to receive rich gas and to separate liquid (such as NGLs) from the rich gas to produce lean fuel gas. A first valve is coupled before the (second) separator to receive the rich gas to expand the rich gas in a throttling or Joule-Thomson effect to reduce the pressure and temperature of the rich gas for the (second) separator. A first heat exchanger is coupled before the first valve to transfer heat from the rich gas to the lean fuel gas, and thus cool the rich gas.

In one aspect, a first separator can be coupled to receive rich gas to separate liquid (such as water) from the rich gas to preprocess the rich gas. In another aspect, a temperature control loop can utilize a slip stream from the first separator. A second valve can be coupled to the first separator to receive the rich gas to expand the rich gas in a throttling or Joule-Thomson effect to reduce the pressure and temperature of the rich gas and defining the slip stream. A third heat exchanger can be coupled between the first and second separators, and to the slip stream, to transfer heat from the rich gas to the slip stream, and thus cool the rich gas.

Figure 2:
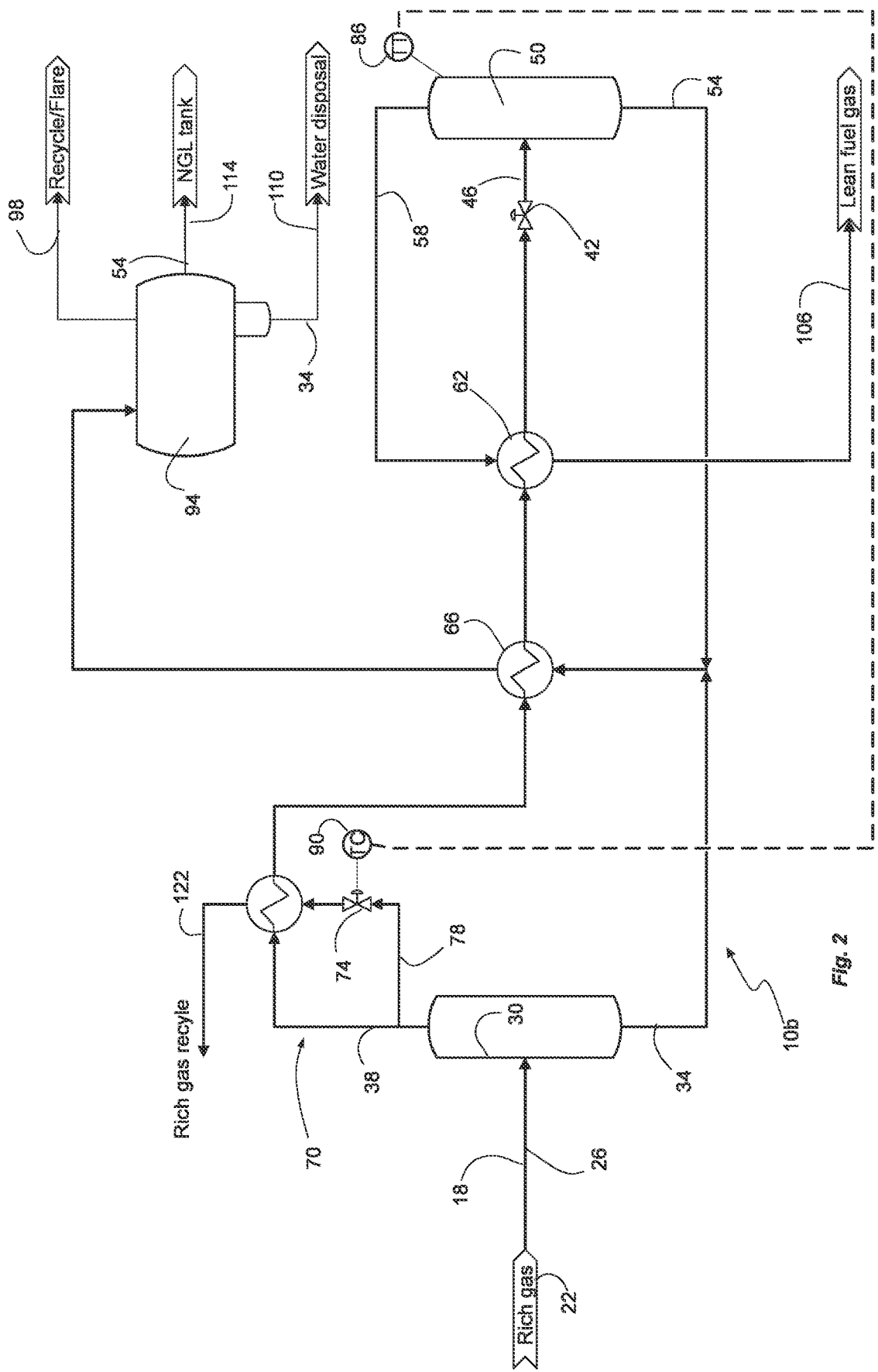
FIG. 2 is a schematic pipe diagram of another fuel gas system in accordance with another embodiment.
Figure 3:
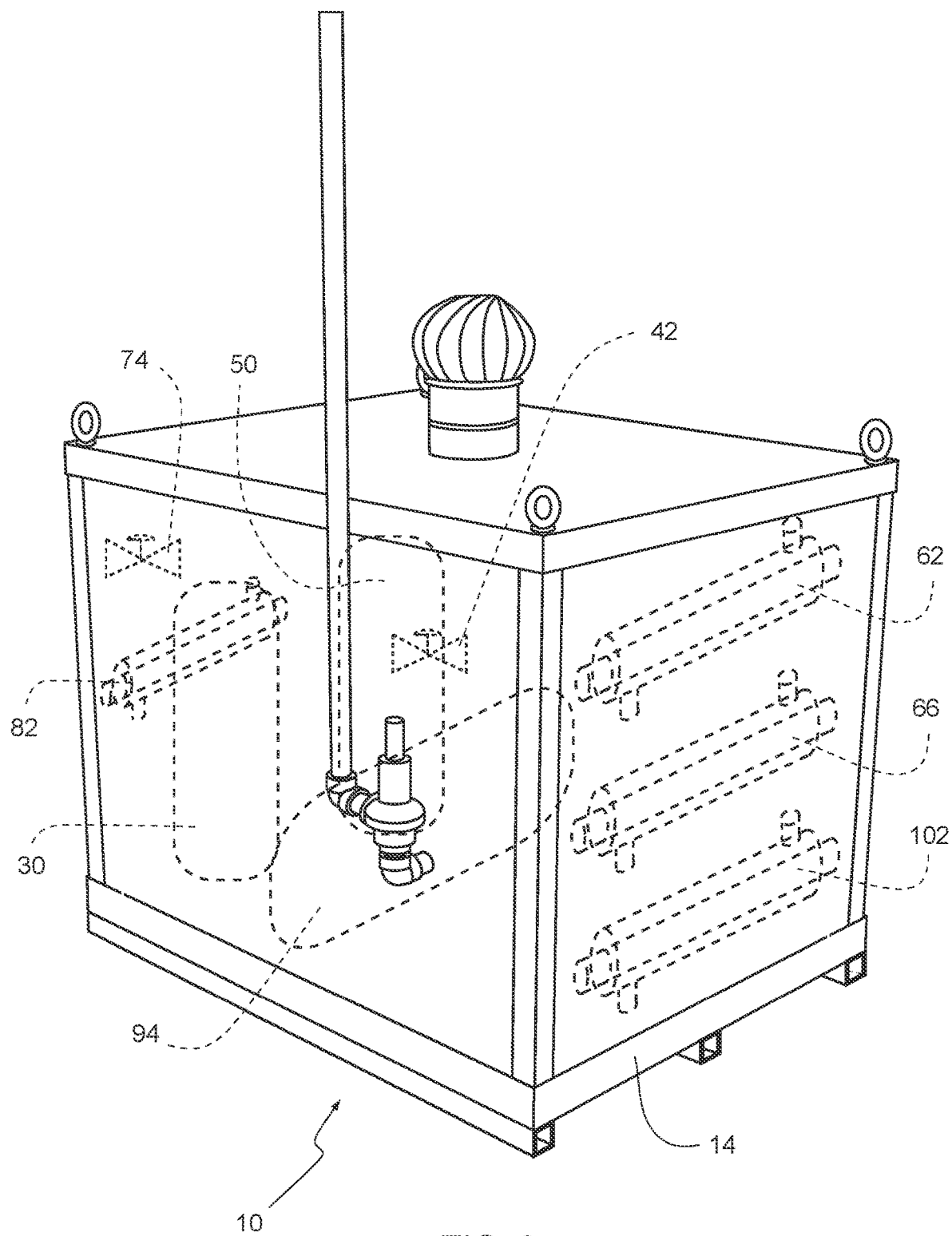
FIG. 3 is a perspective view of another fuel system in accordance with another embodiment.

Referring to FIGS. 1-3, a fuel gas conditioner or system 10 is shown in embodiments of the invention to produce a lean fuel gas from a wet or rich gas. In one aspect, the system 10 can comprise a mobile skid 14 to be deliverable to a site requiring gas conditioning. An inlet 18 can be carried by the skid 14 and can be coupled to a rich gas source 22. In one aspect, the rich gas (indicated at 26) can be at high-pressure and high-temperature. The high-pressure can be between 800-1200 psig, and the high temperature can be between 70-110° F.

The system 10 can have a first separator 30 carried by the skid 14 and coupled to the inlet 18 to receive the high-pressure and high-temperature rich gas 26. The first separator 30 separates liquid, including water (indicated at 34), from the rich gas 26 resulting in high-pressure and high-temperature pre-conditioned gas (indicated at 38). The first separator 30 can provide preconditioning of the rich gas and a preprocess water removal to make the system 10 and method more efficient.

A first valve 42 can be carried by the skid 14 and coupled to the first separator 30 (and between the first and second separators as discussed further below). The first valve 42 receives the high-pressure and high-temperature pre-conditioned gas 38 and expands the pre-conditioned gas 38 in a throttling or Joule-Thomson effect to reduce the pressure and temperature of the pre-conditioned gas 38 resulting in low-pressure and low-temperature pre-conditioned gas (indicated by 46) (for the second separator as discussed further below). The pre-conditioned gas 46 still contains NGLs, and may still contain water. Thus, the pre-conditioned gas 46 may still be considered rich gas.

A second separator 50 can be carried by the skid 14 and coupled to the first separator 30 and the first valve 42. Thus, the first valve 42 can be coupled between the first and second separators 30 and 50. The second separator 50 receives the low-pressure and low-temperature pre-conditioned gas 46 and further separates liquid, including natural gas liquids (NGLs) (indicated at 54) from the low-pressure and low-temperature pre-conditioned gas 46 to produce lean fuel gas (indicated at 58). The second separator 50 can be configured to operate, and the first valve 42 can produce the low-pressure and low-temperature pre-conditioned gas 46, at a low-pressure between 50-150 psig and a low-temperature between −50 to −90° F.

A series of heat exchangers can be coupled between the first and second separators 30 and 50 to cool the pre-conditioned gas 46. Thus, the pre-conditioned gas 46 can pass through the heat exchangers from the first separator 30 to the first valve 42 and the second heat exchanger 50. In addition, the heat exchangers can be coupled to the first and second separators 30 and 50 (and a third heat exchanger and second valve as discussed further below).

A first heat exchanger 62 can be carried by the skid 14 and coupled between the first and second separators 30 and 50. In addition, the first heat exchanger 62 can be coupled to the second separator 50. The first heat exchanger transfers heat from the pre-conditioned gas 38 to the lean fuel gas 58, thus cooling the pre-conditioned gas 38 and warming the lean fuel gas 58. Thus, the lean fuel gas 58 can cool the pre-conditioned or rich gas 38 along with the expansion of the pre-conditioned or rich gas 38 from the first valve 42.

Reducing the temperature of the pre-conditioned or rich gas 38 facilitates the removal of NGLs in the second separator 50.

A second heat exchanger 66 can also be carried by the skid 14 and coupled between and to the first and second separators. In addition, the second heat exchanger 66 can be coupled to the first and second separators 30 and 50 to transfer heat from the pre-conditioned gas 38 to separated liquid (such as water 34 and NGLs 54) from the first and second separators 30 and 50. Thus, the second heat exchanger 66 cools the pre-conditioned gas 38. The separated liquids from both the first and second separators 30 and 50 may contain both water 34 and NGLs 54.

In addition, the system 10 can have a temperature control loop 70. A second valve 74 can be carried by the skid 14 and can be coupled to the first separator 30. The second valve 74 can receive a portion of the pre-conditioned gas 38, namely a slip stream (indicated at 78), and can expand the pre-conditioned gas or slip stream 78 in a throttling or Joule-Thomson effect to reduce the pressure and temperature of the pre-conditioned gas or slip stream 78. A third heat exchanger 82 can be carried by the skid 14 and can be coupled between the first and second separators 30 and 50. In addition, the third heat exchanger 82 can be coupled to the slip stream 78, to transfer heat from the pre-conditioned gas 38 to the slip stream 78. The second valve 74 and the third heat exchanger 82 can define the temperature control loop 70. Furthermore, a temperature sensor 86 can be associated with the second separator 50 to sense the temperature inside the second separator 50 and/or a temperature of the lean fuel gas 58. A control actuator 90 can be associated with the second valve 74 and can be coupled to the temperature sensor 86. The control actuator 90 can control the second valve 74 base on the temperature sensed by the temperature sensor 86. The temperature control loop 70 can provide a feature for controlling the temperature of the system 10 in warmer seasons and climates. The slip stream 78 can be recycled back to the rich gas source 22.

In another aspect, the system 10 can provide liquid recovery. A third three-phase separator 94 can also be carried by the skid 14, and can be coupled to the first and second separators 30 and 50. The third separator 94 can receive the liquid (such as the water 34 and the NGLs 54), and can separate the liquid into residue gas (indicated at 98), waste water 34, and NGLs or other hydro-carbon liquids 54. A fourth heat exchanger 102 can also be carried by the skid 14, and can be coupled between the first and second separators 30 and 50. In addition, the fourth heat exchanger 102 can be coupled to the third three-phase separator 94 to transfer heat from the pre-conditioned gas 38 to the residual gas 98.

As described above, the system 10 can comprise the mobile skid 14. The mobile skid 14 can be transportable, and thus delivered and retrieved from a well site or any location requiring gas processing. The skid 14 can have a base that can be disposed on the ground adjacent the well head or gas producing facility. The skid 14 can have a floor, a roof, and a perimeter wall. The floor can be configured to be elevated and/or to have lower openings below the floor to accommodate the forks of a forklift. In another aspect, the skid 14 can have eyelets secured to a top thereof to allow the mobile skid 14 to be lifted with hooks, cables and a crane or loader.

The inlet 18, the first separator 30, the second separator 50, the first valve 42, the first heat exchanger 62, the second heat exchanger 66, the second valve 74, the third heat exchanger 82, the third three-phase separator 94, and the fourth heat exchanger 102 can all be carried by the skid 14. In addition, the system 10 and the skid 14 can have a conditioned lean fuel gas outlet 106 carried by the skid 14 and coupled to the first heat exchanger 62 and the second separator 50. A waste water outlet 110 can be carried by the skid 14 and coupled to the third three-phase separator 94. The waste water outlet 110 can be coupled to a water disposal to remove waste water 34 from the system 10 and the skid 14. An NGL outlet 114 can be carried by the skid 14 and coupled to the third three-phase separator 94. The NGL outlet 114 can be coupled to an NGL tank to remove NGLs 54 from the system 10 and the skid 14 for storage and later use. A residue gas vent 118 can be carried by the skid 14 and coupled to the third three-phase separator 94. The gas vent 118 can be coupled to a recycler or flare. A rich gas recycle outlet 122 can be carried by the skid 14 to recycle the slip stream 78.

A method for conditioning fuel gas, and for using the conditioner and system 10 described herein, can comprise:
1) separating liquid, such as water 34, from a rich gas 26 in a first separator 30 at a high pressure and a high temperature, resulting in high-pressure and high-temperature pre-conditioned gas 38 that can contain high-pressure and high-temperature hydrocarbon liquids;
2) cooling the pre-conditioned gas 38 in a series of heat exchangers, including first, second and third heat exchangers 62, 66 and 82;
3) expanding the high-pressure and high-temperature pre-conditioned gas 38 in a Joule-Thomson effect to reduce the pressure and temperature of the pre-conditioned gas 38 by passing the pre-conditioned gas 38 through a first valve 42 resulting in low-temperature and low-pressure pre-conditioned gas 46;
4) separating liquids, such as hydrocarbon liquids and/or NGLs 54, from the pre-conditioned gas 46 in a second separator 50 resulting in a lean fuel gas 58 and hydrocarbon liquids and/or NGLs 54;
5) passing the lean fuel gas 58 through the first heat exchanger 62 to cool the pre-conditioned gas 38;
6) passing the liquid, such as the water 34, the hydrocarbon liquids and/or NGLs 54, through the second heat exchanger 66 to cool the pre-conditioned gas 38;
7) taking a slip stream 78 of the high-pressure and high-temperature pre-conditioned gas 38 after the first separator 30; and
8) passing the slip stream 78 through the third heat exchanger 82 to cool the pre-conditioned gas 38.

The method can further comprise:
1) cooling the pre-conditioned gas 38 in a fourth heat exchanger 102;
2) separating the liquid 34 and 54 from the first and second separators 30 and 50 in a third three-phase separator 94 into residue gas 98, waste water 34 and NGLs 54; and
3) passing the residue gas 98 through the fourth heat 102 exchanger to cool the pre-conditioned rich gas.

The method can further comprise:
1) sensing a temperature of the second separator 50 with a temperature sensor 86; and
2) controlling the second valve 74 based on the temperature sensed by the temperature sensor 86 at the second separator 50.

Referring to FIG. 2, another fuel gas conditioner and system 10b is shown in accordance with another embodiment. The system 10b is similar in many respects to the system 10 described above, and which description is hereby incorporated herein by reference. The description of the system 10b applies to the system 10 above as well. The system 10b can be the same as the system 10 described above, but without a fourth heat exchanger.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A method for conditioning fuel gas, the method comprising:
    a) separating liquid from a rich gas in a first separator at a high pressure and a high temperature resulting in high-pressure and high-temperature pre-conditioned gas containing high-pressure and high-temperature hydrocarbon liquids;
    b) cooling the high-pressure and high-temperature pre-conditioned gas in a series of heat exchangers, including first and second heat exchangers;
    c) expanding the high-pressure and high-temperature pre-conditioned gas in a Joule-Thomson effect to reduce the pressure and temperature of the high-pressure and high-temperature pre-conditioned gas by passing the high-pressure and high-temperature pre-conditioned gas through a first valve resulting in low-temperature and low-pressure pre-conditioned gas;
    d) separating liquids from the low-temperature and low-pressure pre-conditioned gas in a second separator resulting in a lean fuel gas;
    e) passing the lean fuel gas through the first heat exchanger to cool the high-pressure and high-temperature pre-conditioned gas; and
    f) passing the liquids from the first and second separators through the second heat exchanger to cool the high-pressure and high-temperature pre-conditioned gas.

2. The method in accordance with claim 1, further comprising:
    a) cooling the high-pressure and high-temperature pre-conditioned gas in another heat exchanger;
    b) separating the liquid from the first and second separators in a third three-phase separator into residue gas, waste water and natural gas liquids (NGLs); and
    c) passing the residue gas through the another heat exchanger to cool the high-pressure and high-temperature pre-conditioned rich-gas.

3. The method in accordance with claim 1, further comprising:
    coupling the first separator to a rich gas source at a high pressure between 800-1200 psig and a high temperature between 70-110° F.

4. The method in accordance with claim 1, further comprising:
    separating hydrocarbon liquids from the low-temperature and low-pressure pre-conditioned gas in the second separator at a low-pressure between 50-150 psig and a low-temperature between −50 to −90° F.

5. The method in accordance with claim 1, further comprising:
    a) taking a slip stream of the high-pressure and high-temperature pre-conditioned gas after the first separator;
    b) expanding the high-pressure and high-temperature pre-conditioned gas in the slip stream in a Joule-Thomson effect to reduce the pressure and temperature of the high-pressure and high-temperature pre-conditioned gas by passing the high-pressure and high-temperature pre-conditioned gas through a second valve; and
    c) passing the slip stream through a third heat exchanger to cool the high-pressure and high-temperature pre-conditioned gas.

6. The method in accordance with claim 5, further comprising:
    sensing a temperature of the second separator; and
    controlling the second valve based on the temperature sensed at the second separator.

7. The method in accordance with claim 1, further comprising:
    delivering a mobile skid to a site, the mobile skid having an inlet, the first separator, the second separator, the first valve, the first heat exchanger, the second heat exchanger, and a conditioned lean fuel gas outlet.

8. A method for conditioning fuel gas, comprising:
    a) separating liquid including water from a rich gas in a first separator at a high pressure and a high temperature, resulting in a high-pressure and high-temperature pre-conditioned gas that contains high-pressure and high-temperature hydrocarbon liquids;
    b) cooling the high-pressure and high-temperature pre-conditioned gas in a series of heat exchangers, including first and second heat exchangers;
    c) expanding the high-pressure and high-temperature pre-conditioned gas in a Joule-Thomson effect to reduce the pressure and temperature of the high-pressure and high-temperature pre-conditioned gas by passing the high-pressure and high-temperature pre-conditioned gas through a first valve resulting in a low-temperature and low-pressure pre-conditioned gas;
    d) separating liquids including natural gas liquids (NGLs) from the low-temperature and low-pressure pre-conditioned gas in a second separator resulting in a lean fuel gas;
    e) passing the lean fuel gas through the first heat exchanger to cool the high-pressure and high-temperature pre-conditioned gas; and
    f) passing the liquid including the water and the NGLs through the second heat exchanger to cool the high-pressure and high-temperature pre-conditioned gas.

9. The method in accordance with claim 8, further comprising:
    a) cooling the high-pressure and high-temperature pre-conditioned gas in another heat exchanger;

b) separating the liquid from the first and second separators in a third three-phase separator into residue gas, waste water and NGLs; and c) passing the residue gas through the another heat exchanger to cool the high-pressure and high-temperature pre-conditioned gas.

10. The method in accordance with claim 8, further comprising:

a) taking a slip stream of the high-pressure and high-temperature pre-conditioned gas after the first separator;

b) expanding the high-pressure and high-temperature pre-conditioned gas in the slip stream in a Joule-Thomson effect to reduce the pressure and temperature of the high-pressure and high-temperature pre-conditioned gas by passing the high-pressure and high-temperature pre-conditioned gas through a second valve; and c) passing the slip stream through a third heat exchanger to cool the high-pressure and high-temperature pre-conditioned gas.

11. The method in accordance with claim 10, further comprising:

a) sensing a temperature of the second separator with a temperature sensor; and b) controlling the second valve with a control actuator based on temperature sensed by the temperature sensor.

12. The method in accordance with claim 8, wherein the rich gas is at a high-pressure between 800-1200 psig and a high temperature between 70-110° F.

13. The method in accordance with claim 8, wherein the second separator is configured to operate at low-pressure between 50-150 psig and low-temperature between −50 to −90° F.

14. The method in accordance with claim 8, further comprising:

delivering a mobile skid to a site, the mobile skid having an inlet, the first separator, the second separator, the first valve, the first heat exchanger, the second heat exchanger, and a conditioned lean fuel gas outlet.

15. A method for conditioning fuel gas, comprising:

a) separating liquid including water from a rich gas in a first separator at a high-pressure and a high-temperature, resulting in high-pressure and high-temperature pre-conditioned gas;

b) expanding the high-pressure and high-temperature pre-conditioned gas in a Joule-Thomson effect to reduce the pressure and temperature of the high-pressure and high-temperature pre-conditioned gas by passing the high-pressure and high-temperature pre-conditioned gas through a first valve resulting in a low-temperature and low-pressure pre-conditioned gas;

c) separating liquid including natural gas liquids (NGLs) from the low-temperature and low-pressure pre-conditioned gas in a second separator to produce lean fuel gas;

d) passing the lean fuel gas through a first heat exchanger to cool the high-pressure and high-temperature pre-conditioned gas; and e) passing separated liquid from the first and second separators through a second heat exchanger to cool the high-pressure and high-temperature pre-conditioned gas.

16. The method in accordance with claim 15, further comprising:

a) separating the liquid from the first and second separators in a third three-phase separator into residue gas, waste water and NGLs; and b) passing the residue gas through another heat exchanger to cool the high-pressure and high-temperature pre-conditioned gas.

17. The method in accordance with claim 15, wherein the rich gas is at a high-pressure between 800-1200 psig and a high temperature between 70-110° F.

18. The method in accordance with claim 15, wherein the second separator is configured to operate at low-pressure between 50-150 psig and low-temperature between −50 to −90° F.

19. The method in accordance with claim 15, further comprising:

delivering a mobile skid to a site, the mobile skid having an inlet, the first separator, the second separator, the first valve, the first heat exchanger, the second heat exchanger, and a conditioned lean fuel gas outlet.

20. The method in accordance with claim 15, further comprising:

coupling an inlet to a rich gas source at high-pressure and high-temperature.

* * * * *